J. L. BROOMFIELD.
SPRING OPERATING MEANS FOR NUT LOCKS.
APPLICATION FILED JAN. 20, 1912.
1,067,163.
Patented July 8, 1913.
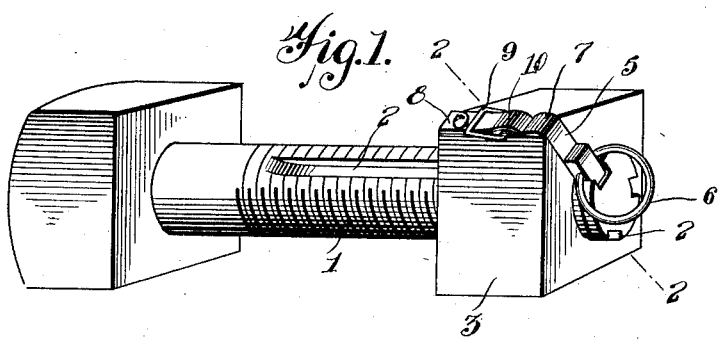
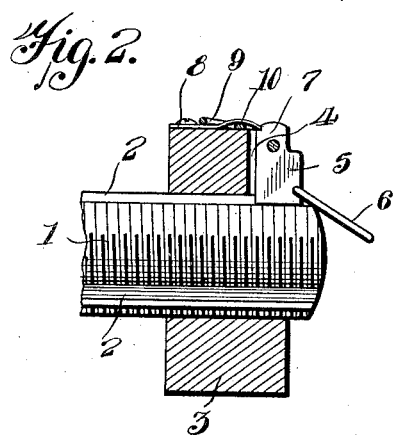
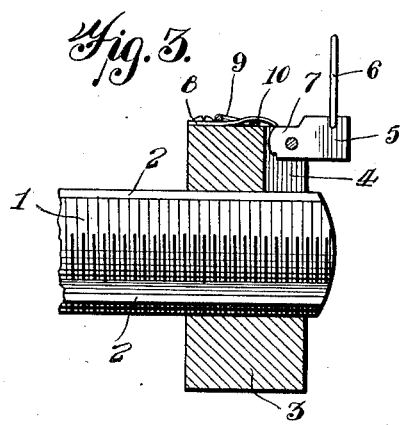
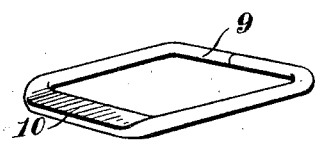
Witnesses
Carroll Bailey
Inventor
James L. Broomfield,
By Victor J. Evans
Attorney

UNITED STATES PATENT OFFICE.

JAMES L. BROOMFIELD, OF SEATTLE, WASHINGTON.

SPRING OPERATING MEANS FOR NUT-LOCKS.

1,067,163. Specification of Letters Patent. Patented July 8, 1913.

Application filed January 20, 1912. Serial No. 672,278.

*To all whom it may concern:*

Be it known that I, JAMES L. BROOMFIELD, a citizen of the United States, residing at Seattle, in the county of King and State of Washington, have invented new and useful Improvements in Spring Operating Means for Nut-Locks, of which the following is a specification.

This invention relates to certain novel improvements in nut locks.

In carrying out my invention it is my purpose to provide simple and effective means coöperating between a nut and a bolt whereby the said nut will be sustained against rotation upon the bolt.

I further aim to provide in a device of this character means whereby the nut may be easily and quickly removed from the bolt when desired.

It is also my purpose to provide an ordinary nut with a locking dog which is adapted to be sustained in a position within a groove formed upon the bolt through the medium of a spring member, the nut being further provided with a cam beneath the spring element and which upon operation in one direction will release the dog to permit of the latter being withdrawn from the groove or recess of the bolt.

With the above recited objects and others of a similar nature in view, the invention resides in the construction, combination and operative arrangement of parts set forth in and falling within the scope of the appended claim.

In the drawings, Figure 1 is a perspective view of a nut and bolt constructed in accordance with the present invention. Fig. 2 is a sectional view taken approximately upon the line 2—2 of Fig. 1. Fig. 3 is a similar sectional view illustrating the locking dog in its raised or releasing position. Fig. 4 is a perspective view of the yoke member provided with the cam face for operating the spring latch upon the locking dog.

Referring now to the drawings in detail, the numeral 1 designates an ordinary threaded bolt. This bolt is formed with a plurality of longitudinally extending depressions or channels 2, the same intersecting the threaded extremity of the bolt.

The numeral 3 designates a nut. This nut is of an ordinary formation but is provided with a radially arranged depression or pocket 4, the same communicating with a slightly depressed portion provided upon one of the corners of the nut. The pocket 4 is adapted for the reception of a locking dog 5, the same being pivoted to the sides of the nut adjacent the said pocket 4. This pocket 4 comprises a flattened substantially rectangular member, the same being of a length when swung downwardly within the pocket, to engage with any of the channels 2 of the bolt 1, after the bolt has been screwed home upon the nut. The upper portion of the locking dog is enlarged, the said enlargement being formed with a transversely arranged opening and passing through the opening is a ring or a similar element designated by the numeral 6, and which is adapted to serve as a lift for swinging the locking dog out of engagement with the channels of the bolt when the spring latch, presently to be described is operated. The locking dog 5 beyond its pivot and opposite its engaging face is formed with an extending tail 7, and this tail is adapted to have its under face contacted by a flattened spring latch 8. The latch 8 is received within the depressed portion which communicates with the pocket 4 and has its rear portion secured to the nut in any desired or preferred manner.

The numeral 9 designates a bail, the same comprising a rectangular member which has its side arms extending in a plane substantially parallel with the edges of the spring latch 8, and which has one of its connecting members formed with a cam face 10, the same being arranged within a suitable recess provided by the nut and being positioned directly beneath the under face of the spring latch.

By an arrangement as above described it will be noted that it is merely necessary to rotate the bail so as to bring its cam face 10 into engagement with the flattened under face of the spring latch 8, and the same will be forced away from the nut and its engaging end out of engagement with the tail 7 of the locking dog 5. The ring or lip 6, for the locking dog serves as a means for raising the said dog out of any of the channels 2, so that the nut may be readily removed from the bolt, and so that the flattened spring latch will engage the upper portion of the dog 5 adjacent its enlargement to sustain the said dog in an unlocked position.

It is thought that the above description when taken in connection with the accompanying drawings is sufficient to aid others skilled in the art to which such invention appertains to readily understand the structure as well as the advantages of the improvement, it being noted that none of the elements provided by the locking device will interfere with the operation of a wrench upon the said nut when the nut is to be removed from the bolt.

Having thus described the invention what I claim is:—

In combination with a channeled bolt, a nut for the bolt, a pivoted dog carried by the nut and normally adapted to engage within the channel of the bolt, a spring secured to the nut and adapted to co-act with the dog to hold the dog either in engagement with or out of engagement with the bolt, the said spring having a curved portion adjacent its connected end, a bail for the spring, said bail having a cam face which is adapted to rest between the curved portion of the spring and the nut, and the said cam adapted when the bail is rotated to swing the engaging portion of the spring away from the dog to permit of the dog being rotated into engagement with or out of engagement with the bolt.

In testimony whereof I affix my signature in presence of two witnesses.

JAMES L. BROOMFIELD.

Witnesses:
AMOS GEIST,
GEORGE BROOMFIELD.

Copies of this patent may be obtained for five cents each, by addressing the "Commissioner of Patents, Washington, D. C."